United States Patent
Zhao et al.

(10) Patent No.: US 10,593,029 B2
(45) Date of Patent: Mar. 17, 2020

(54) BLOOM REMOVAL FOR VEHICLE SENSORS

(71) Applicant: Ford Global Technologies, LLC, Dearborn, MI (US)

(72) Inventors: Zhen Zhao, Farmington Hills, MI (US); Codrin Cionca, Ann Arbor, MI (US); Guoyu Lu, Rochester, NY (US); Mostafa Parchami, Dearborn, MI (US); Jeffrey Thomas Remillard, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 87 days.

(21) Appl. No.: 15/927,331

(22) Filed: Mar. 21, 2018

(65) Prior Publication Data
US 2019/0295231 A1 Sep. 26, 2019

(51) Int. Cl.
| | |
|---|---|
| *B60W 30/00* | (2006.01) |
| *G05D 1/02* | (2020.01) |
| *G06K 9/00* | (2006.01) |
| *G06T 5/00* | (2006.01) |
| *G06T 5/50* | (2006.01) |
| *H04N 5/217* | (2011.01) |
| *H04N 5/225* | (2006.01) |
| *H04N 5/33* | (2006.01) |

(52) U.S. Cl.
CPC ............ *G06T 5/50* (2013.01); *G05D 1/0246* (2013.01); *G06K 9/00791* (2013.01); *G06T 5/009* (2013.01); *H04N 5/2256* (2013.01); *H04N 5/332* (2013.01); *G05D 2201/0213* (2013.01); *G06T 2207/10048* (2013.01); *G06T 2207/20224* (2013.01); *G06T 2207/30252* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 7,808,538 | B2 | 10/2010 | Shan et al. |
| 8,699,812 | B2 | 4/2014 | Hsieh et al. |
| 9,329,700 | B2 * | 5/2016 | McGibney ............ G06F 3/0308 |
| 9,462,202 | B2 | 10/2016 | Wang et al. |
| 9,762,830 | B2 | 9/2017 | Jiang et al. |
| 2005/0258370 | A1 | 11/2005 | Kawamura et al. |
| 2006/0208169 | A1 * | 9/2006 | Breed ................... B60N 2/002 250/221 |
| 2009/0226085 | A1 * | 9/2009 | Shiraishi ................. H04N 1/58 382/167 |

(Continued)

OTHER PUBLICATIONS

"Blooming and Anti-Blooming", The Cooke Corporation/pco. imaging; Feb. 2005 copyright PCO ag.

*Primary Examiner* — Soo Shin
(74) *Attorney, Agent, or Firm* — Frank A. MacKenzie; Bejin Bieneman PLC

(57) ABSTRACT

A system, comprising a processor; and a memory, the memory including instructions to be executed by the processor to acquire a first image of a scene, acquire a second image of the scene while illuminating the scene, identify pixel blooming in a subtracted image determined by subtracting the first image from the second image, remediating the pixel blooming based on empirically determined parameters, and operate a vehicle based on the subtracted image.

16 Claims, 12 Drawing Sheets

(56) References Cited

U.S. PATENT DOCUMENTS

| | | | | |
|---|---|---|---|---|
| 2013/0044213 A1* | 2/2013 | Kirmani | ................ | G01J 1/0437 |
| | | | | 348/135 |
| 2017/0234976 A1* | 8/2017 | Grauer | .................. | G01S 17/107 |
| | | | | 356/5.04 |
| 2018/0365824 A1* | 12/2018 | Yuh | ....................... | G06K 9/6262 |
| 2018/0374233 A1* | 12/2018 | Zhou | .......................... | G06T 7/70 |

* cited by examiner

BLOOM REMOVAL FOR VEHICLE SENSORS

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes and objects to be avoided in the vehicle's environment. Safe and efficient operation of the vehicle can depend upon acquiring accurate and timely information regarding routes and objects in a vehicle's environment while the vehicle is being operated on a roadway. For example, vehicle operation can depend on acquiring and acting on images from vehicle optical sensors, e.g. cameras. However, it is a problem to accurately interpret image data under varying lighting conditions. For example, digital images obtained in varying light conditions can include what is referred to as "bloom". It is a problem to remove or remediate bloom so that digital image data can be used for vehicle operation.

DETAILED DESCRIPTION

Figure 1:
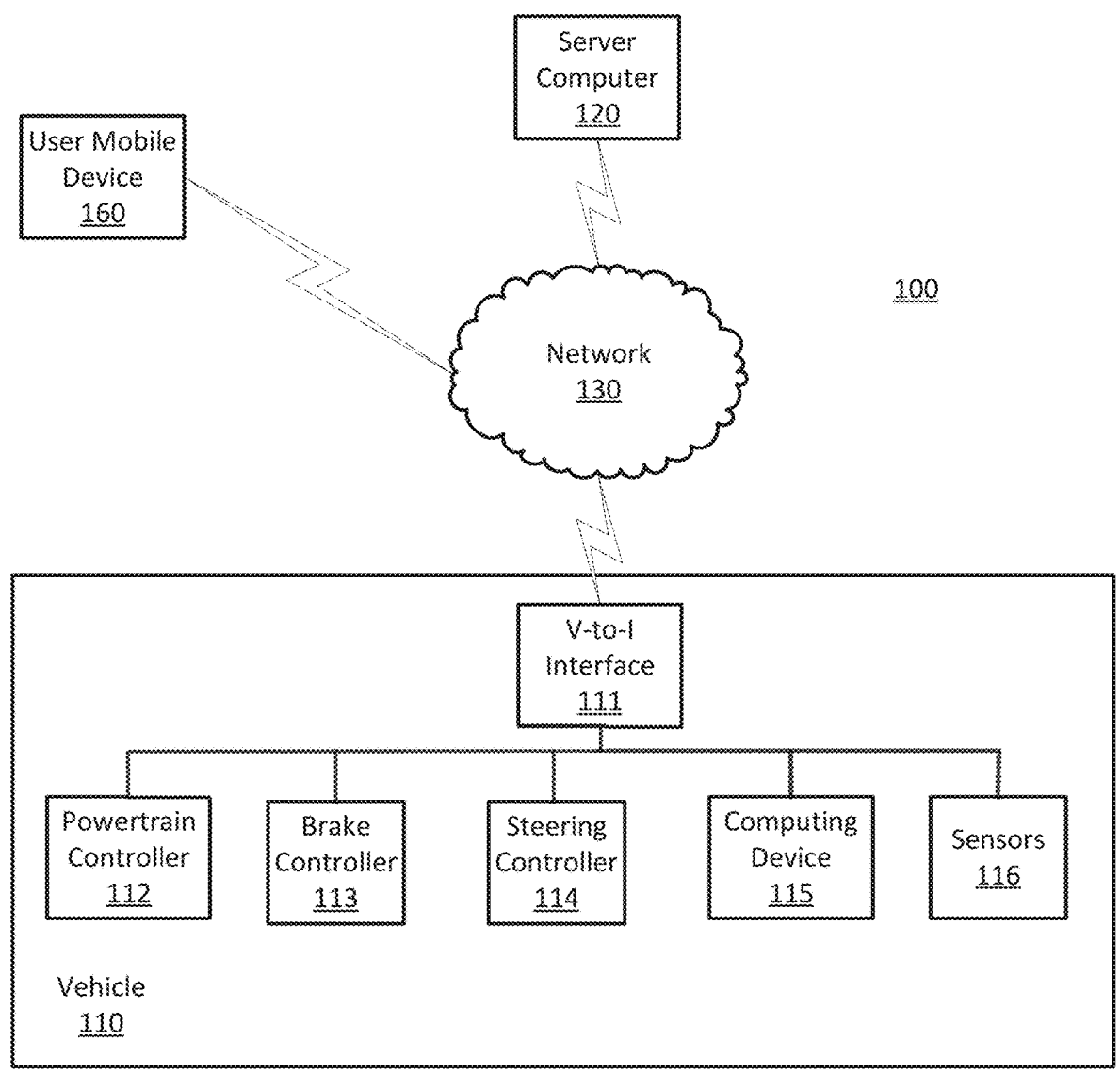
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of vehicle and to use the data to determine trajectories to be used to operate a vehicle from a current location to a destination location, for example. The data can include images acquired from sensors included in a vehicle while illuminating a scene visible to the sensor with electromagnetic radiation. These active illumination sensors include RADAR, LIDAR, and video sensors including visible and infrared (IR). Acquiring data from active illumination sensors while illuminating a scene can provide data that permits a computing device to operate a vehicle under varying environmental conditions including at night, or other low-light conditions, for example.

Disclosed herein is a method, including acquiring a first image of a scene without active illumination, acquiring a second image of the scene while illuminating the scene, identifying pixel blooming in a subtracted image determined by subtracting the first image from the second image, remediating the pixel blooming based on empirically pre-determined parameters, and operating a vehicle based on the subtracted image. The first image can be acquired with an IR video sensor and the second image can be acquired with an IR video sensor while illuminating the scene with IR light. The empirically predetermined parameters can include thresholds and a bounding box overlap ratio. Remediating the pixel blooming can include substantially completely removing the pixel blooming or reducing the pixel blooming depending upon the thresholds and the bounding box overlap ratio. Determining a group of bloomed pixels can be based on processing the subtracted image to identify connected regions of saturated pixels and connected regions of background (i.e., non-saturated) pixels.

Removing the pixel blooming can include setting pixel values of a group of saturated pixels to their original values and reducing the pixel blooming can include reducing an intensity of pixel values of the group of bloomed pixels based on a distance measure. The distance measure can include determining an L2-norm function based on a centroid of saturated pixels. The L2-norm function can be determined based on a log of a distance in rows and columns from the centroid of saturated pixels. The L2-norm function can be normalized by squaring the result of dividing the distance by the maximum distance. The L2-norm function can be modified to take into account the aspect ratio of the bloomed object so that the blooming reduction is specifically tailored to the object's shape. Following reducing the pixel blooming, a second bounding box ratio and whether to remove pixel blooming based on the second bounding box ratio can be determined. Processing the subtracted image to identify connected regions of saturated pixels and connected regions of background pixels can include determining an expanded bloom mask image based on thresholding the subtracted image. Processing the subtracted image to identify connected regions of saturated pixels and connected regions of background pixels can include determining a filtered, expanded bloom mask image based on the expanded bloom mask image and a background mask image.

Further disclosed is a computer readable medium, storing program instructions for executing some or all of the above method steps. Further disclosed is a computer programmed for executing some or all of the above method steps, including a computer apparatus, programmed to acquire a first image of a scene, acquire a second image of the scene while illuminating the scene, identify pixel blooming in a subtracted image determined by subtracting the first image from the second image, remediate the pixel blooming based on empirically predetermined parameters, and operate a vehicle based on the subtracted image. The first image can be acquired with an IR video sensor and the second image can be acquired with an IR video sensor while illuminating the scene with IR light. The empirically predetermined parameters can include thresholds and a bounding box overlap ratio. Remediating the pixel blooming can include removing the pixel blooming or reducing the pixel blooming depending upon the thresholds and the bounding box overlap ratio. Determining a group of bloomed pixels can be based on processing the subtracted image to identify connected regions of saturated pixels and connected regions of background pixels.

Removing the pixel blooming can include setting pixel values of a group of saturated pixels to their original values and reducing the pixel blooming can include reducing an intensity of pixel values of the group of bloomed pixels based on a distance measure. The distance measure can include determining an L2-norm function based on a centroid of saturated pixels. The L2-norm function can be determined based on a log of a distance in rows and columns from the centroid of saturated pixels. The L2-norm function can be normalized by squaring the result of dividing the distance by the maximum distance. The L2-norm function can be modified to take into account the aspect ratio of the bloomed object so that the blooming reduction is specifically tailored to the object's shape. Following reducing the pixel blooming, a second bounding box ratio and whether to remove pixel blooming based on the second bounding box ratio can be determined. Processing the subtracted image to identify connected regions of saturated pixels and connected regions of background pixels can include determining an expanded bloom mask image based on thresholding the subtracted image. Processing the subtracted image to identify connected regions of saturated pixels and connected regions of background pixels can include determining a filtered, expanded bloom mask image based on the expanded bloom mask image and a background mask image.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
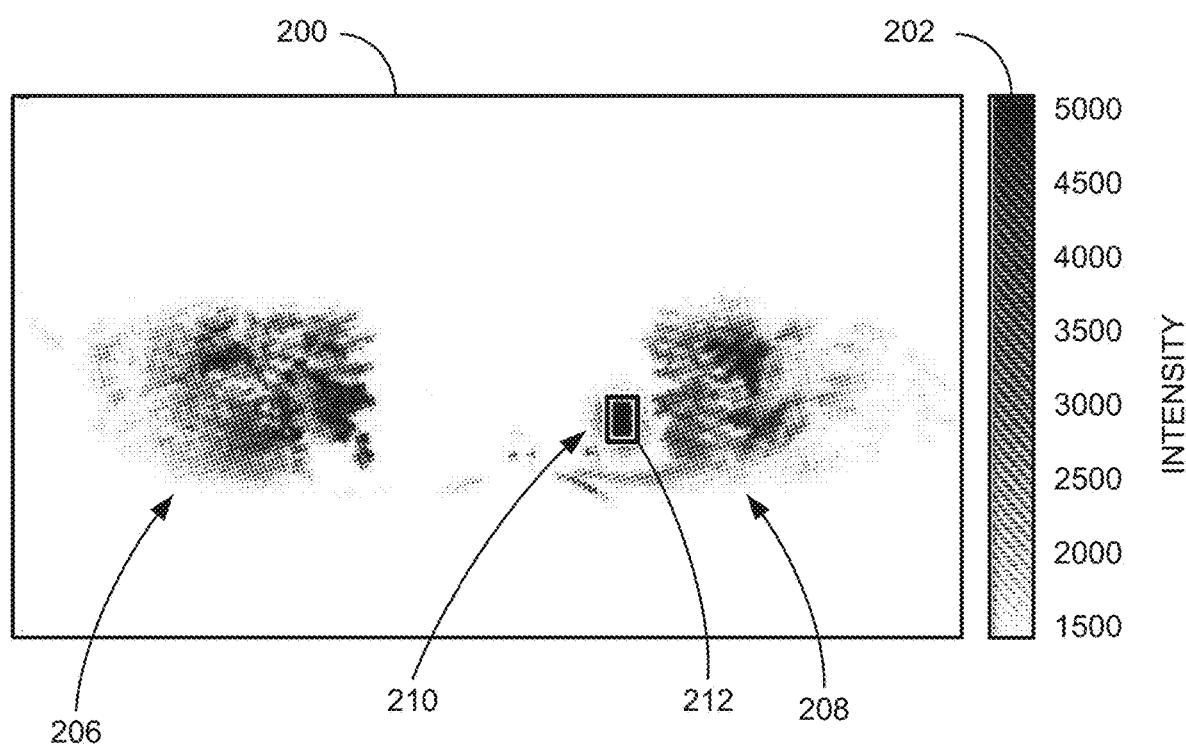
FIG. 2 is a diagram of an example image of a scene illuminated using an active-illumination camera.

FIG. 2 is a diagram of an example image 200 of an illuminated scene. Image 200 is a false-color image rendered in black and white to comply with Patent Office rules. A false-color image 200 is a two-dimensional array of data values or "pixels", wherein each pixel is represented by a single numeric value and the pixels are displayed by assigning displayed colors based on each pixel's numeric value. The relationship between pixel numeric values and colors can be represented by a color scale 202, that depicts intensity, indicated in arbitrary units from 1500 to 5000, as colors, represented here by a halftone rendering in black and white. In this example, a scene is illuminated with IR light and image 200 is acquired by an IR video sensor 116 and transmitted to computing device 115. The scene in image 200 can be illuminated by an IR light source. The IR light source can include an IR light emitting diode (LED), for example, that emits IR light in response to electrical signals from computing device 115. While computing device 115 is directing IR LED to emit IR light, computing device 115 can direct an IR video sensor 116 to acquire an IR video image 200 of the illuminated scene. Because the pixel data included in image 200 is based on active illumination, maximizing the amount of data can include increasing the amount of IR light radiated onto the scene to increase the amount of data acquired. The maximum projected power, in this example, measured in watts/cm$^2$, on surfaces in the scene can be limited by saturation in the IR video sensor 116 that receives the reflected energy from surfaces in the scene.

Maximizing the projected power of the IR illumination can provide image 200 data that includes background data 206, 208. A problem can be caused by saturating return 210 from retro-reflective surfaces such as road signs, construction markers, lane markings, traffic lights, etc., in the scene because, at the power of the IR illumination that permits imaging background data 206, 208, saturating return 210 can saturate an IR video sensor 116 and cause pixel blooming. Retro-reflective surfaces are surfaces that are coated with a membrane (plastic) or paint that includes microscopic glass beads that reflect a high percentage of the light that falls upon them directly back in the direction it was received from, hence the name retro-reflector. On standard CCD or CMOS-based sensors, pixel blooming is caused by excess electrical charge caused by saturated sensor pixels spilling into adjacent pixels on the sensor. Pixel blooming can render a portion or an entire false-color image 200 unusable.

Pixel blooming caused by retro-reflective surfaces in an image 200 can be remediated by removing the pixel blooming or reducing the pixel blooming depending upon the separation between saturating return 210 and background returns 206, 208. Processing an image 200 in this fashion can remove spurious noise from the image 200 and render the image 200 better able to be processed by computing device 115 for tasks related to operation of a vehicle 110 such as machine learning networks including object detection and classification algorithms, for example. When pixels associated with a saturating return 210 are adequately separated from pixels associated with background returns 206, 208, pixels affected by pixel blooming can be substantially completely removed from image 200. Removing pixel blooming is discussed in relation to FIGS. 4-8, below. When saturating return 210 is not adequately separated from pixels associated with background returns 206, 208, removing the pixels affected by blooming can result in removing pixels associated with background returns 206, 208, an unwanted consequence. In this case, the effect of pixel blooming can be reduced by applying a distance-based intensity reduction matrix calculated to reduce pixel blooming. The intensity reduction matrix is discussed in relation to FIGS. 9 and 10, below. Following the step of reducing the pixel blooming, the image 200 can be checked again to see if the new saturating return 210 is no longer overlapped with background returns 206, 208, and can now be substantially completely removed. In both cases the original intensity information from the retro-reflector causing the saturating return 210 is included in the image 200 following processing.

Processing image 200 to remediate pixel blooming begins by acquiring an image 200 without illuminating the scene. This provides a baseline image 200 that can be subtracted from a subsequent image 200, acquired while illuminating the scene with an IR light. This removes background illumination and removes pixels with intensity values below the noise level of the sensor. Following background subtraction, a bounding box 212 can be determined based on saturating return 210. Computing device 115 can threshold image 200 to determine a binary image that includes 8-way connected regions, where each connected region corresponds to a saturating return 210. Thresholding image 200 refers to an image transformation wherein output pixel is given a value of "1" if the value of an input pixel is greater than a predetermined threshold value and "0" if the value of the input pixel is less than a predetermined threshold value. 8-way connectivity refers to determining that a first "1" pixel is connected to a second "1" pixel if the second pixel neighbors the first pixel within a 3-pixel by 3-pixel window with the first pixel at the center. Connected regions of "1" pixels can be formed by grouping 8-way connected "1" pixels. Since a saturating return 210 can have return intensities many orders of magnitude greater than background returns 206, 208, empirically determining a threshold value is straightforward and can be accurately used to segment saturating returns 210 from retro-reflective objects from background returns 206, 208 from background objects.

Following segmenting a saturating return 210 from the background to form a binary image, computing device 115 can use machine vision software programs to determine a bounding box 212 for each connected region in the binary image corresponding to a saturating return 210. For example, the "regionprops" function included in the MATLAB™ Image Processing Library (Mathworks, Natick, Mass. 01760, Rev. R2017a) can be used to determine a bounding box 212 in a binary image associated with the segmented saturating return 210. The bounding box 212 specifies the starting x, y pixel coordinates and the height and width of the bounding box 212 in pixels. In FIG. 1, pixel blooming associated with saturating return 210 is indicated by the high-intensity pixels within bounding box 212.

Figure 3:
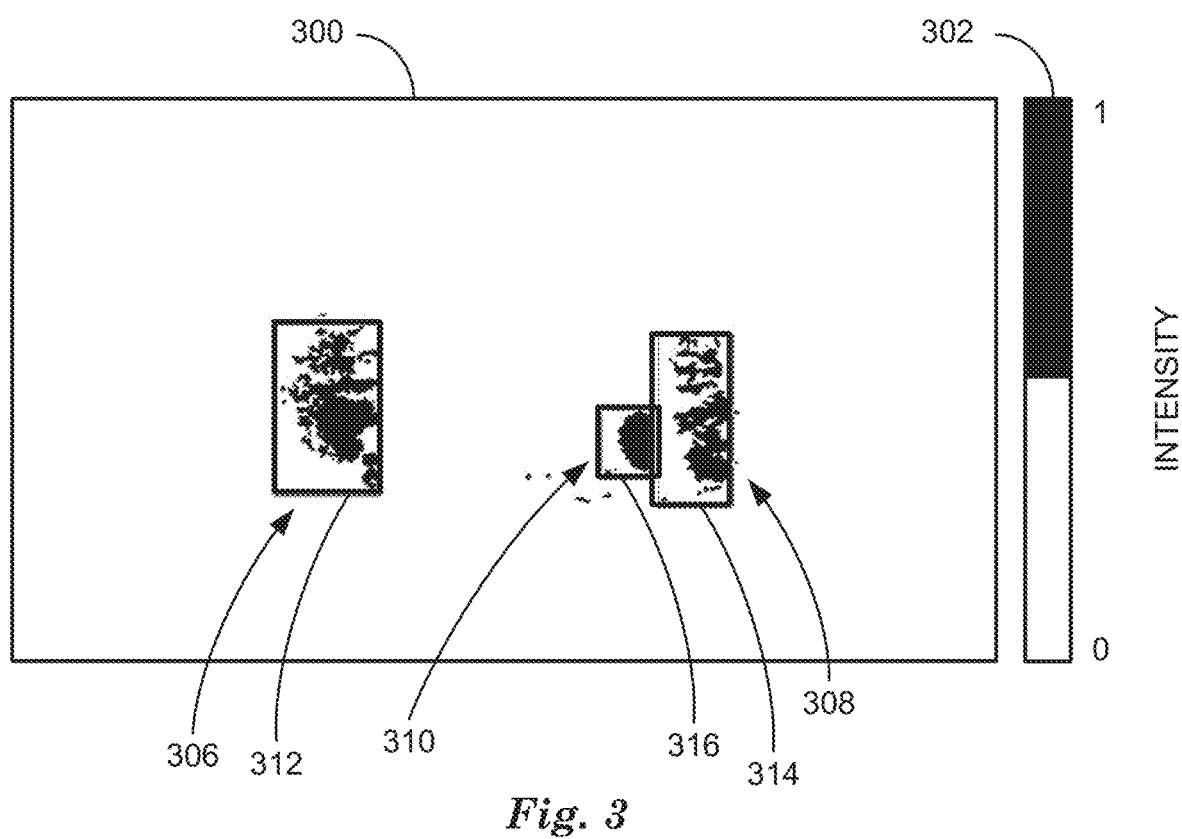
FIG. 3 is a diagram of an example image including bounding boxes that surrounds both non-bloomed and bloomed pixels.

FIG. 3 shows further processing of an example binary mask image 300 including bounding boxes. Binary mask image 300 can be formed from false color image 200 by thresholding. Color scale 302 indicates that pixel values represented in binary image 300 include "1", represented by black pixels and "0" represented by white pixels. In this case, the threshold used to form binary mask image 300 from false color image 200 can be determined empirically to form connected regions for background returns to form binary masks 306, 308 and saturated returns to form binary mask 310. Binary mask image 300 can be processed by computing device 115 using machine vision software programs including morphological operators to create one or more binary mask image 300 including binary masks 306, 308, 310 based on image 200. The binary mask image 300 can be a tight bloom mask created by performing "close" and "spur" operations on the binary image 200. For example, the "close" and "spur" operations are included in the "bwmorph" function of the MATLAB™ Image Processing Library. These morphological operations create clean and tight binary masks based on the connected regions including binary masks 306, 308, 310 in a binary mask image 300 larger than an empirically determined minimum size, such as 10 pixels, for example. Bounding boxes 312, 314, 316 can be determined as discussed above in relation to FIG. 2 for binary masks 306, 308, 310 in a binary image 300.

An overlap ratio between a bounding box 316 associated with a binary mask 310 based on a saturating return 210 and a bounding box 314 associated with a binary mask 308 based on a background return 208 can be used to determine whether to remove blooming pixels or reduce blooming pixels. Overlap ratio can be determined using an intersection-over-union technique. In this technique, the ratio of the area in pixels of the intersection (binary OR) of the two bounding boxes 314, 316 is divided by the union (binary AND) of the two bounding boxes 314, 316. The resulting overlap ratio can then be compared to an empirically determined ratio. If the determined overlap ratio is equal to or greater than the predetermined ratio, blooming pixels associated with the saturating return 210 can be successfully removed from the image 200 without affecting pixels associated with background return 208.

If the overlap ratio is less than the predetermined ratio, removing blooming pixels associated with saturating return 210 would also remove pixels associated with background return 208, an unwanted result. In this case, blooming pixels associated with the saturating return 210 can be reduced rather than removed to preserve pixels associated with background return 208. In image 300, the overlap ratio between bounding box 314 associated with binary mask 308 and bounding box 316 associated with binary mask 310 is less than a predetermined ratio, for example 5%, where the predetermined ratio can be preferably between 1% and 10%. An overlap ratio can also be determined based on the overlap between bounding box 212 from image 200 and bounding box 314 in image 300 and compared to an empirically determined value as described in the preceding paragraph to obtain a second measure of overlap.

Figure 4:
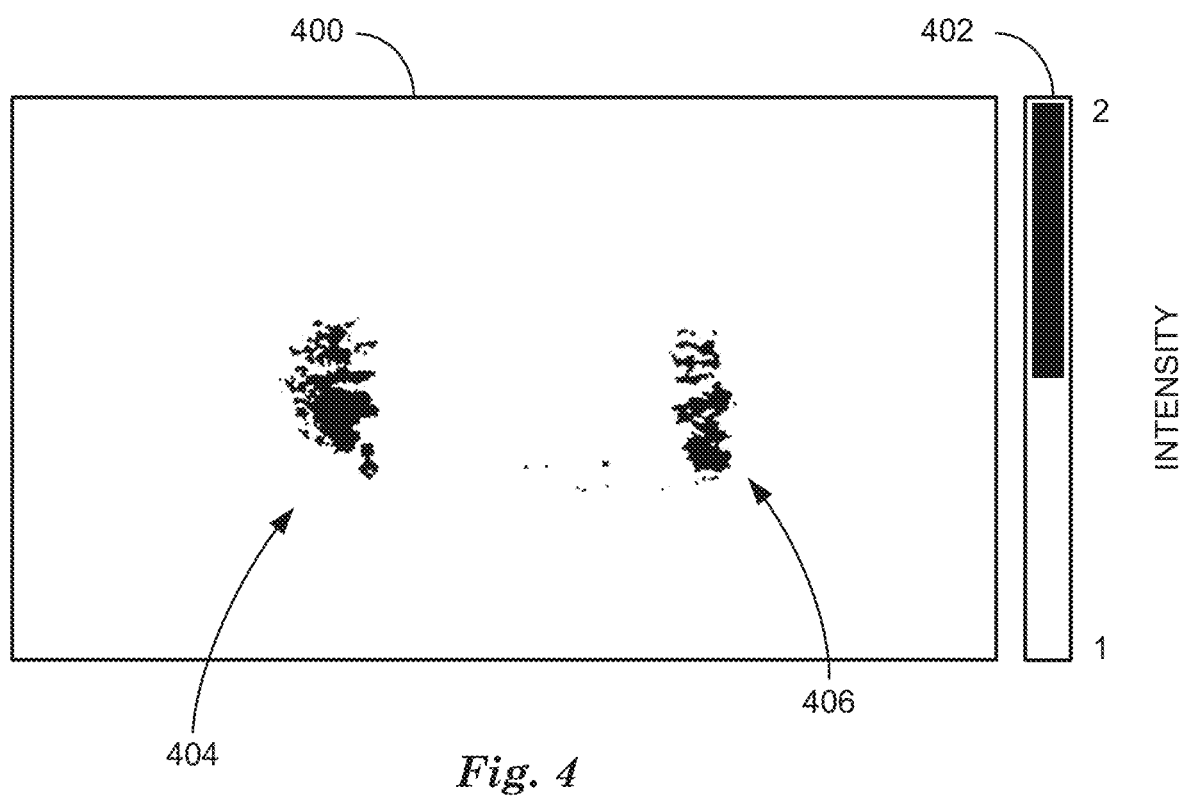
FIG. 4 is a diagram of an example image processed to remove bloomed pixels only.

FIG. 4 is a black and white rendering of a false-color expanded bloom mask 400. False-color expanded bloom mask 400 encodes the binary pixels of expanded bloom mask 400 as either 1 or 2, rather than 0 or 1, indicated by color scale 402. Expanded bloom mask 400 is formed by subtracting pixels associated with binary mask 310 based on saturating returns 210 within the intersection of bounding box 212 from image 200 and bounding box 314 associated with binary mask 308 from image 300 to form expanded bloom mask 400.

Figure 5:
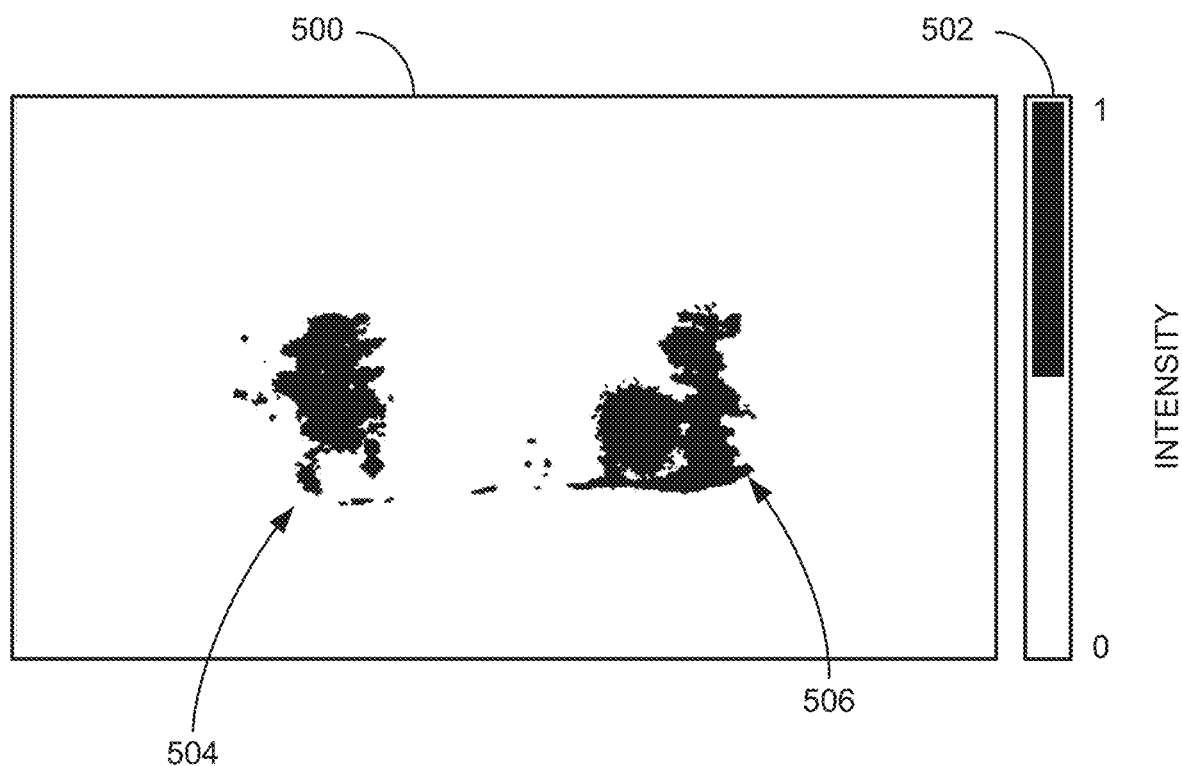
FIG. 5 is a diagram of an example image processed to determine connected regions.

FIG. 5 is a black and white rendering of a false-color binary expanded bloom mask image 500. False-color binary expanded bloom mask image 500 encodes the binary pixels of expanded bloom mask image 500 as 0 or 1, shown by color scale 502. Expanded bloom mask is formed by first thresholding false color image 200 using an empirically determined threshold that is lower than the threshold used to form binary image 300. This threshold can be determined empirically using calibrated retro-reflective materials, wherein the strength of the return signals can be predetermined, for example. Note that expanded bloom mask 400 includes more bloomed pixels than binary image 300.

Figure 6:
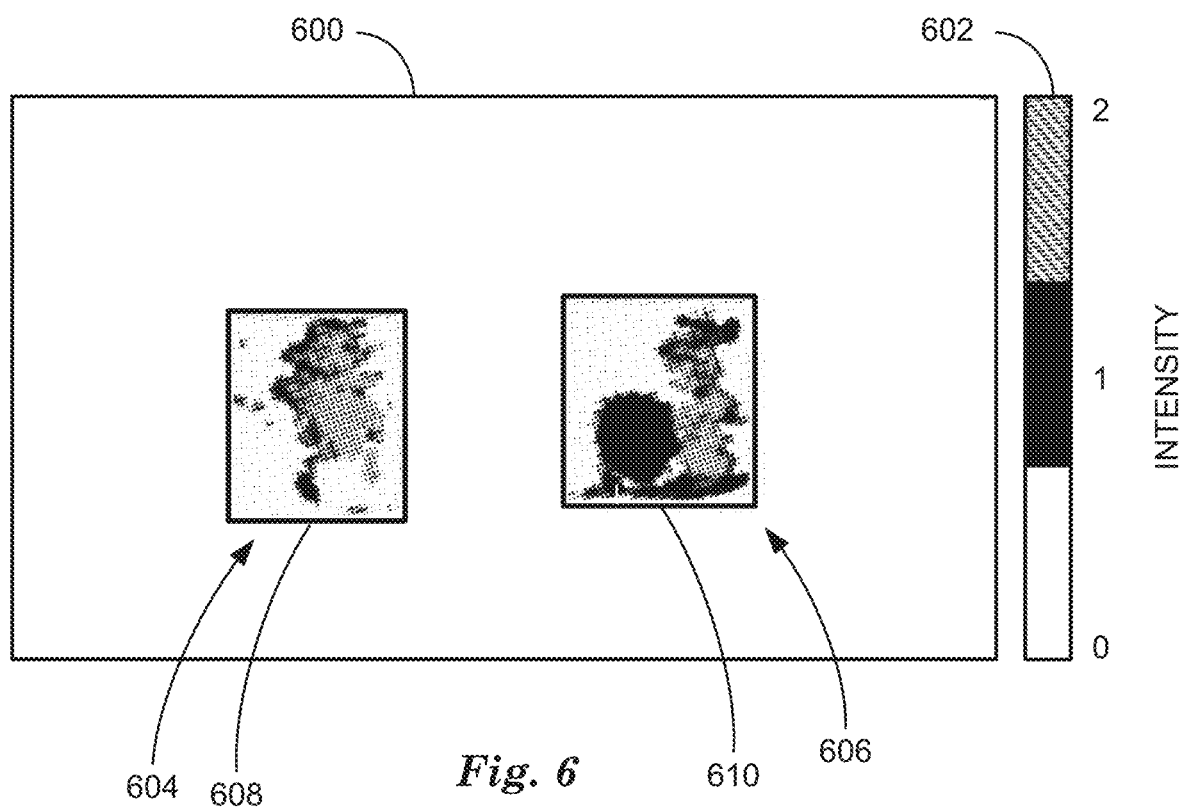
FIG. 6 is a diagram of an example image processed to determine non-blooming pixels.

FIG. 6 is a black and white rendering of a false-color expanded bloom and background mask image 600. False-color expanded bloom mask and background mask image 600 encoded pixels as either 0, 1, or 2, as shown by color scale 602. Pixels in expanded bloom and background mask image 600 are formed by multiplying pixels of expanded bloom mask 400 and background mask image 300. Maximal bloom removal with maximal background retention can be accomplished by removing value "1" (black) pixels from the expanded bloom and background mask image 600 and retaining "2" (halftone) pixels for bounding box 610 that is overlapped by a bounding box 212 associated with a saturating return 210, indicating that the bounding box 610 is associated with pixel blooming. Note that since bounding box 608 is not overlapped with a bounding box 212 associated with a saturating return 210, both "1" and "2" pixels can be retained, since bounding box 608 is not associated with pixel blooming.

Figure 7:
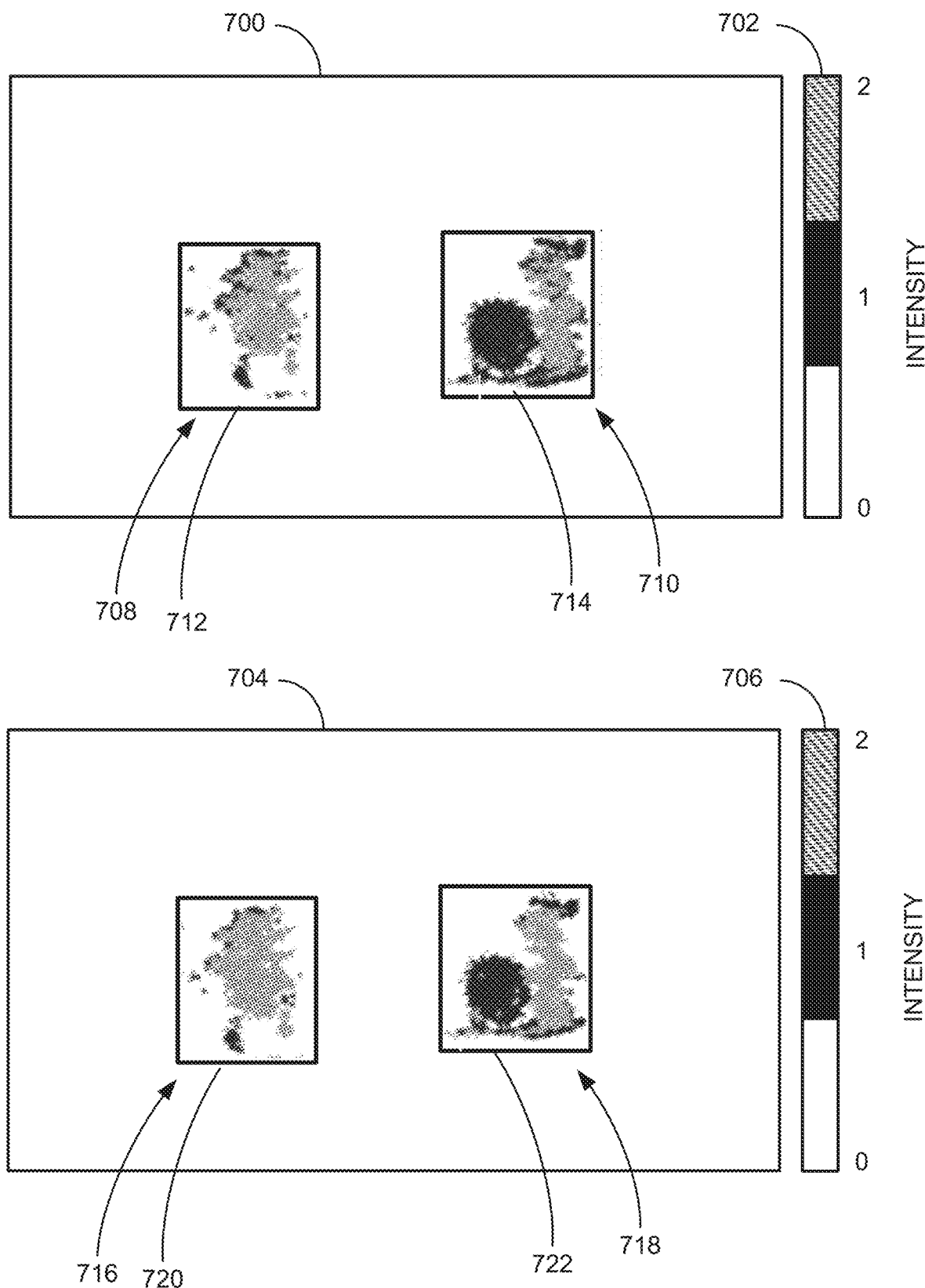
FIG. 7 is a diagram of two example images processed to determine non-blooming pixels.

FIG. 7 are black and white renderings of two false-color filtered, expanded bloom and background mask images 700, 704. Filtered, expanded bloom and background mask images 700, 704 encode pixels as either 0, 1, or 2, as shown by color scales 702, 706. Pixels of filtered, expanded bloom and background mask images 700, 704 are formed by multiplying pixels of expanded bloom mask 400 and background mask image 300, as described above in relation to FIG. 6, and then filtered with morphological filters to expand the retained background pixels while still excluding blooming pixels. An example morphological filter that is the "imdilate" function included in the MATLAB™ Image Processing Toolbox. Filtered, expanded bloom and background mask images 700, 704 represent filtering with a 3×3 and a 7×7 window respectively. As can be seen in filtered, expanded bloom and background mask images 700, 704, where the larger-sized filter window includes more background pixels while also including more blooming pixels. Window size to determine the ratio between background pixels and blooming pixels retained can be determined empirically based on test data using calibrated retro-reflectors as discussed above in relation to FIG. 5.

Figure 8:
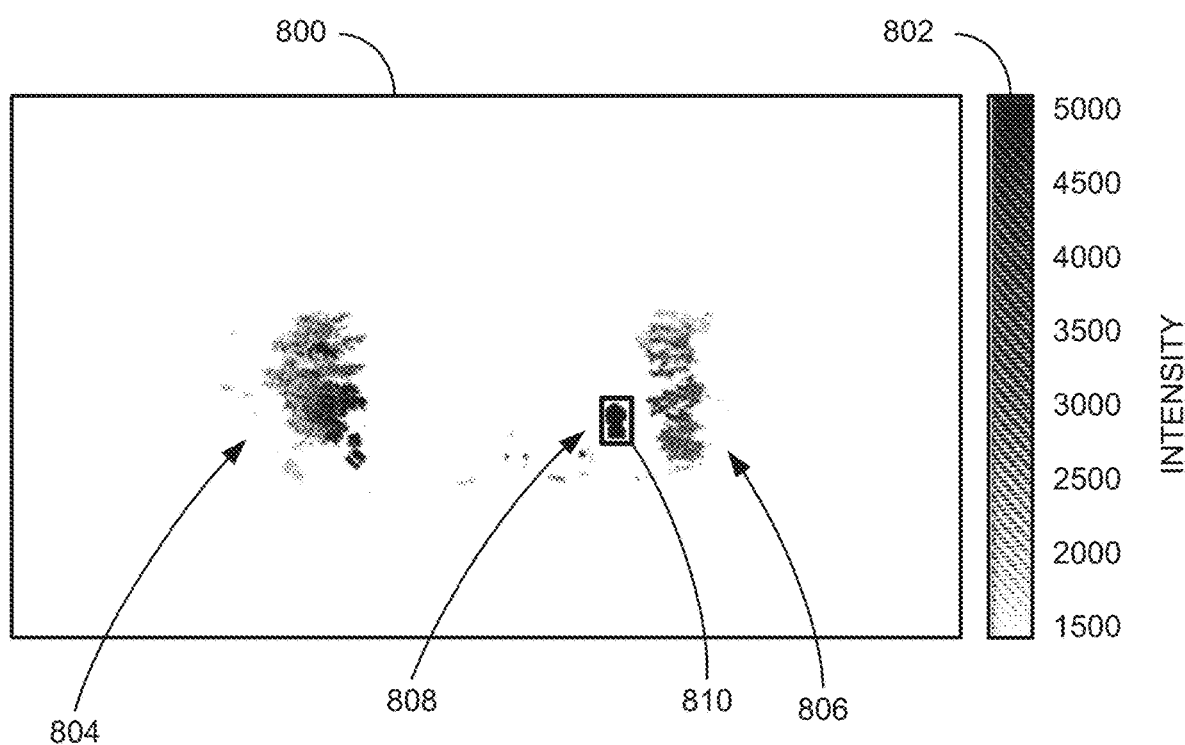
FIG. 8 is a diagram of an example image processed to remediate blooming.

FIG. 8 is a black and white rendering of a false-color output image 800. False-color output image encodes pixels according to color scale 802, where intensity is represented by arbitrary units from 1500 to 5000. Output image 800 includes background returns 804, 806, formed by multiplying image 200 by a binary mask formed from a filtered, expanded bloom and background mask image 700, 704. In addition to masked pixels from image 200, included in output image 800 are pixels 808 set back to the original intensities of the retro-reflector, indicated by a bounding box 810. This process removes the maximum number of bloomed pixels while maintaining the original intensities of the retro-reflector.

Figure 9:
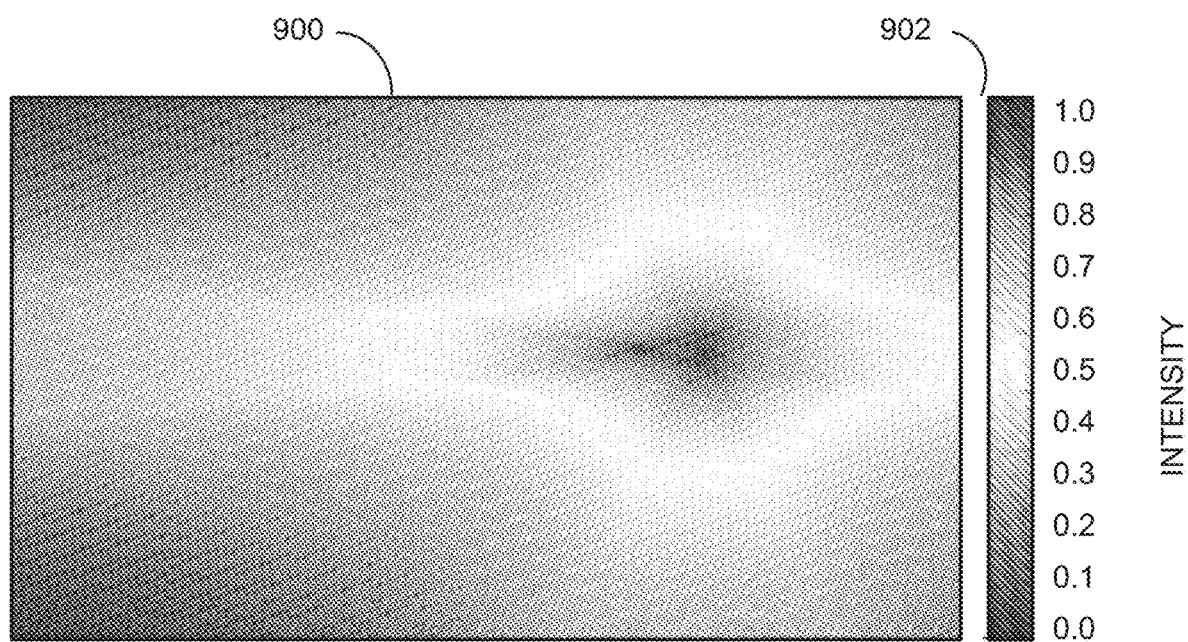
FIG. 9 is a diagram of an example L2 Norm tailored to the aspect ratio of a bloomed object in an image.

FIG. 9 is a black and white rendering of a false-color image 900 of an L2-norm function. The value of a pixel of L2-norm function image 900 is indicated by color scale 902. An L2-norm function is a distance-based intensity reduction matrix used to decrease pixel blooming in pixels around saturating returns by decreasing the intensity values of pixels according to their distance from a saturating return. The L2-norm function can be convolved with a false-color image 900 depending upon saturating returns to decrease the intensity values of pixels depending upon distance, for example.

Figure 10:
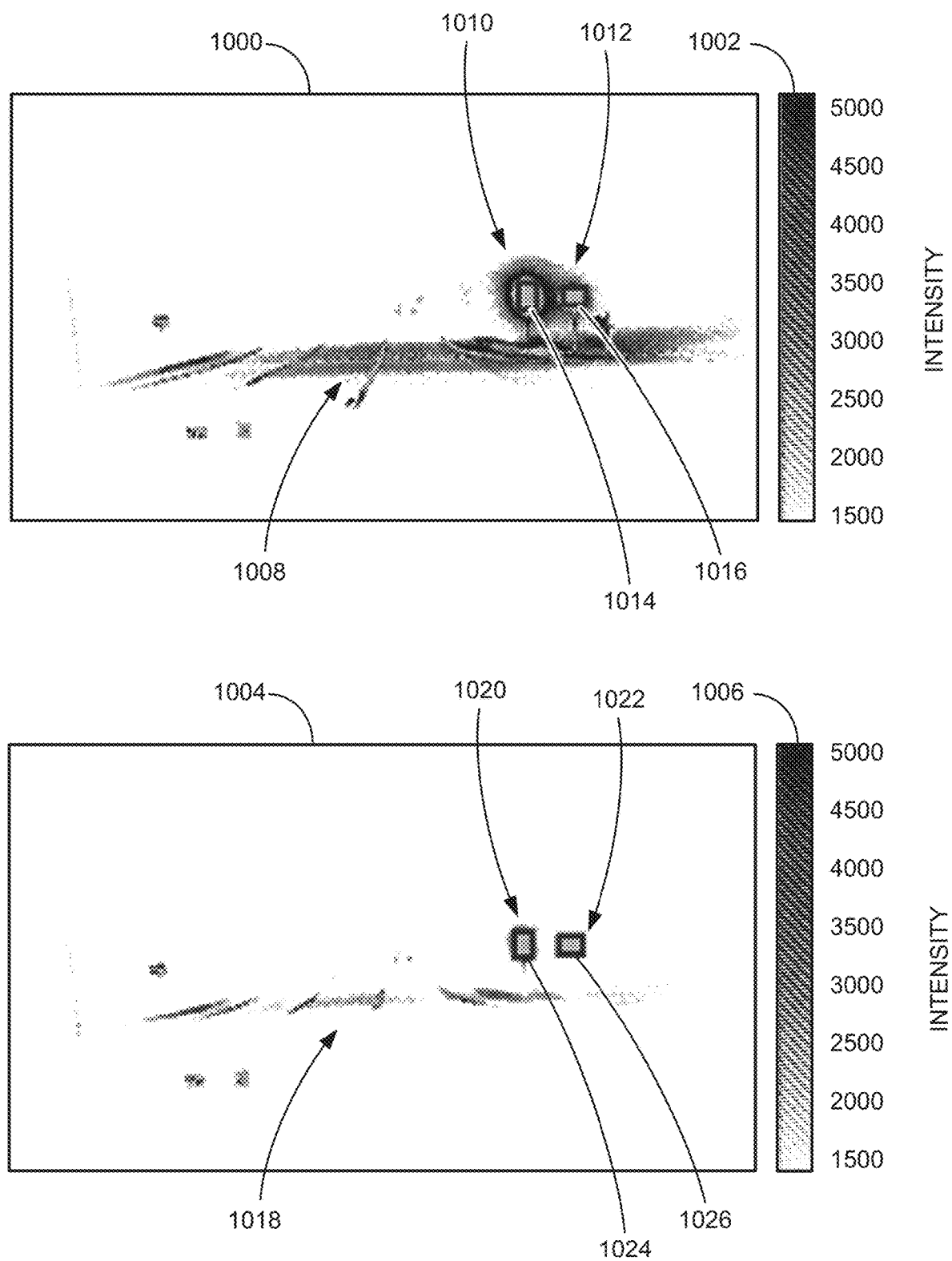
FIG. 10 is a diagram of two example images before and after bloom remediation using the L2 Norm in FIG. 9.

FIG. 10 illustrates black and white renderings of false-color image 1000, and false-color output image 1004. Intensity values in image 1000 and output image 1004 are encoded in arbitrary units as shown by color scales 1002, 1006. Image 1000 includes background returns 1006 and saturating returns 1010, 1012, from retro-reflectors, where saturating returns 1010, 1012 are identified and surrounded by bounding boxes 1014, 1016 as described in relation to FIG. 2, above. In this example, blooming pixels caused by saturating returns 1010, 1012 cause bounding boxes 1014, 1016 overlap bounding boxes surrounding background returns 1006 with an overlap ratio that is greater than the predetermined ratio, which means that bloom removal as described above in relation to FIGS. 3-8 cannot be performed without removing a significant fraction of background pixels. In this example, performing bloom removal results in elimination of all background pixels in output image 1004.

In this example, intensity-weighted centroids for saturating return 1010, 1012 can be calculated by determining a center of mass for each saturating returns 1010, 1012, for example. The weighted centroid for each saturating returns 1010, 1012 can be calculated using the "regionprops" function in the MATLAB™ Image Processing Library, for example, where a distance-based intensity reduction is performed based on pixel distance from the saturating returns 1010, 1012 weighted centroid. The intensity reduction can be calculated as the absolute value of the log of the L2-norm of the distance from the weighted centroid by equations 1 and 2:

$$\text{dists} = |\log(|(\text{col}-\text{centroid}_x)|^{width} + |(\text{row}-\text{centroid}_y)|^{height}|)| \quad (1)$$

$$\text{dists} = (\text{dists}/\max(\text{dists}))^2 \quad (2)$$

where row and col indicate rows and columns of the image 1000, $\text{centroid}_x$ and $\text{centroid}_y$ indicate the x, y coordinates of the intensity-weighted centroids of the saturating returns 1010, 1012 and width and height are the width and height in pixels of the bounding boxes 1014, 1016, respectively and dists is the calculated intensity based on an L2-norm function 900 distance-based intensity reduction matrix, normalized by squaring the result of dividing dists by the maximum dists.

The example distance-based intensity reduction matrix shown in L2-norm function image 900 is calculated based on saturating returns 1010, 1012. Note the asymmetry in L2-norm function image 900 due to asymmetry in the dimensions of the two saturating returns 1010, 1012. Following bloom reduction based on the L2-norm function image 900, the original pixel values of the saturating returns 1020, 1022 can be restored in output image 1004 within the bounding boxes 1024, 126, respectively. In this fashion pixel blooming can be reduced while preserving the maximum number of background pixels.

Figure 11:
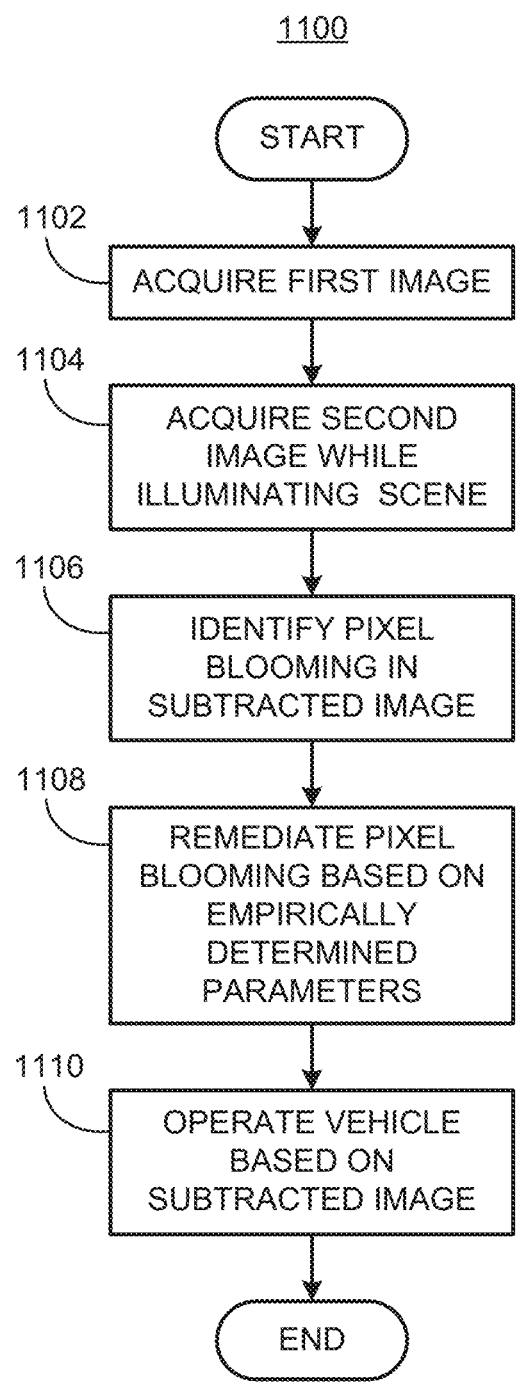
FIG. 11 is a flowchart diagram of an example process to operate a vehicle based on remediating pixel blooming in an image.

FIG. 11 is a diagram of a flowchart, described in relation to FIGS. 1-10, of a process 1100 for operating a vehicle based on remediating pixel blooming in a subtracted image. Process 1100 can be implemented by a processor of computing device 115, taking as input information from sensors 116, and executing commands and sending control signals via controllers 112, 113, 114, for example. Process 1100 includes multiple steps taken in the disclosed order. Process 1100 also includes implementations including fewer steps or can include the steps taken in different orders.

Process 1100 begins at step 1102, where a computing device 115 included in a vehicle 110 acquires a first image.

The first image can be acquired by a vehicle 110 sensor 116, including an IR video sensor as described in relation to FIG. 2, above.

At step 1104 computing device 115 acquires a second image with an IR video sensor 116 while illuminating a scene in a field of view of sensor 116 with a light source that emits light energy to illuminate the scene, for example an IR LED as described in relation to FIG. 2, above.

At step 1106, computing device 115 subtracts the first image from the second image to eliminate background noise and create subtracted image 200, and identifies pixel blooming in subtracting image 200 by determining saturating returns 210 associated with retro-reflectors in the scene as described in relation to FIG. 2, above.

At step 1108, computing device 115 remediates pixel blooming in subtracted image 200 based on empirically determined parameters. Remediating pixel blooming includes either removing or reducing saturating returns 210 depending upon the results of comparing a determined overlap ratio to a predetermined ratio, where the overlap ratio is based on bounding boxes 212, 314, 316 as described in relation to FIGS. 2-8. In addition, following reducing pixel blooming, output image 1004, for example, can be processed to determine if any of the reduced saturating returns 210 are now eligible for removal using techniques described in relation to FIGS. 2-8.

At step 1110, computing device 115 operates vehicle 110 based on output image 800 with pixel blooming removed or output image 1004 with pixel blooming reduced. Operating vehicle 100 based on output image 800 or output image 1004 means inputting output image 800 or output image 1004 to software programs executing on computing device 115 to determine control signals to be communicated to controllers 112, 113, 114 to control vehicle steering, braking and powertrain components to direct vehicle 110 to travel to a destination as described in relation to FIG. 1, above. Following step 1110, process 1100 ends.

Figure 12:
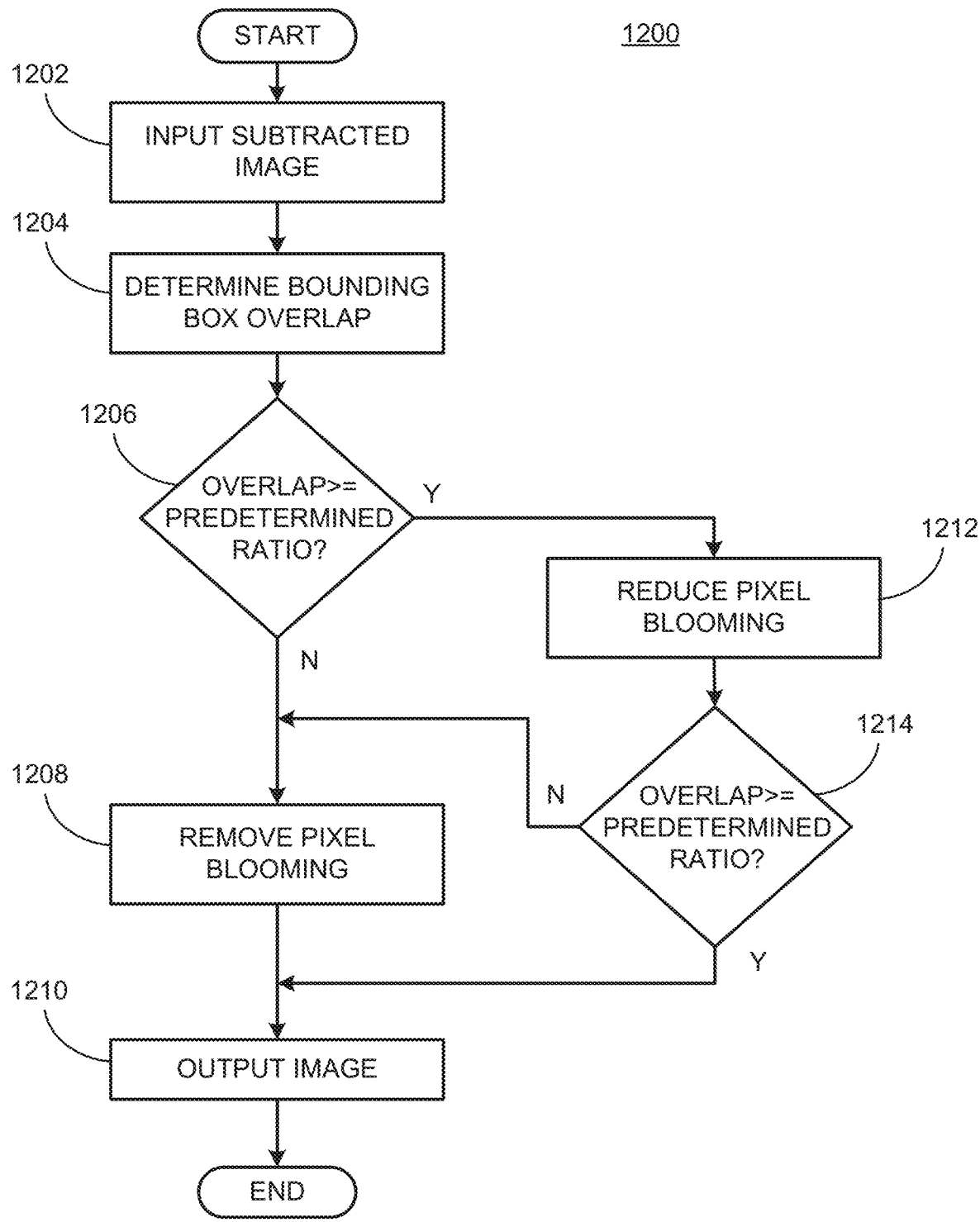
FIG. 12 is a flowchart diagram of an example process to remediate pixel blooming in an image.

FIG. 12 is a diagram of a flowchart, described in relation to FIGS. 1-10, of a process 1200 for remediating pixel blooming in a subtracted image. Process 1200 corresponds to step 1108 in process 1100 of FIG. 11. Process 1200 can be implemented by a processor of computing device 115, taking as input information from sensors 116, and executing commands and sending control signals via controllers 112, 113, 114, for example. Process 1200 includes multiple steps taken in the disclosed order. Process 1200 also includes implementations including fewer steps or can include the steps taken in different orders.

Process 1200 begins at step 1202, where a computing device 115 included in a vehicle 110 inputs a subtracted image 200. Subtracted image 200 has been determined to include blooming pixels, indicated by a saturating return 210 associated with one or more retro-reflectors in the subtracted image 200. Saturating returns 210 are identified by thresholding the subtracted image based on an empirically predetermined threshold as discussed in relation to FIG. 2, above.

At step 1204, computing device 115 determines bounding boxes 212, 312, 314, 316 associated with saturating returns 210, and binary masks 306, 308, 310 and thereby determines an overlap ratio for overlapping bounding boxes 212, 314, 316 as discussed in relation to FIG. 3, above.

At step 1206, the overlap ratio determined at step 1204 is compared to an empirically predetermined ratio. In examples where the overlap parameter is greater than the predetermined ratio, process 1200 passes to step 1212 to reduce pixel blooming. In examples where the overlap parameter is greater than or equal to the predetermined ratio, process 1200 passes to step 1208 to remove pixel blooming.

At step 1208, computing device 115 removes pixel blooming by processing image 200 using mask images 700, 704 according to overlap ratios to create output image 800 as discussed above in relation to FIGS. 2-8. Following step 1208, process 1200 passes to step 1210 to output the output image 800, 1004.

At step 1212, computing device 115 reduces pixel blooming by convolving image 700 with an L2-norm function 900 to reduce pixel blooming by distance-based intensity reduction as discussed above in relation to FIGS. 9 and 10 to produce an output image 1004.

At step 1214, computing device 115 can determine bounding boxes 1014, 1016 in output image 1004 to determine if overlap ratios have changed as a result of processing output image 1004 to reduce pixel blooming. If overlap ratios have changed so that the overlap ratios are less than the empirically predetermined value, computing device, process 1200 passes to step 1208 to remove pixel blooming in output image 1004. If the determined overlap ratios are still greater than or equal to the empirically predetermined ratio, process 1200 passes to step 1210 to output the output image 800, 1004.

At step 1210, computing device 115 outputs the remediated output image 800, 1004, with blooming pixel removed or reduced, to be stored at nonvolatile memory devices associated with computing device 115. Output image 800, 1004 can be recalled by computing device 115 from non-volatile memory to be used to operate vehicle 110 as described above in relation to FIG. 1. Following step 1210 process 1200 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
    acquiring a first image of a scene;
    acquiring a second image of the scene while illuminating the scene;
    identifying pixel blooming in a subtracted image determined by subtracting the first image from the second image;
    remediating the pixel blooming by reducing an intensity of pixel values of a group of bloomed pixels based on a distance measure, wherein the distance measure is calculated based on an absolute value of a log of an L2-norm of a distance from a weighted centroid; and
    operating a vehicle based on the subtracted image.

2. The method of claim 1, further comprising acquiring the first image with an IR video sensor.

3. The method of claim 1, further comprising acquiring the second image with an IR video sensor while illuminating the scene with IR light.

4. The method of claim 1, wherein empirically predetermined parameters include thresholds and a bounding box overlap ratio.

5. The method of claim 4, wherein remediating the pixel blooming includes removing the pixel blooming or reducing the pixel blooming depending upon the thresholds and the bounding box overlap ratio.

6. The method of claim 5, further comprising determining a group of bloomed pixels based on processing the subtracted image to identify connected regions of saturated pixels and connected regions of background pixels.

7. The method of claim 6, wherein removing the pixel blooming includes setting pixel values of a group of saturated pixels to their original values.

8. A system, comprising a processor; and
    a memory, the memory including instructions to be executed by the processor to:
    acquire a first image of a scene;
    acquire a second image of the scene while illuminating the scene;
    identify pixel blooming in a subtracted image determined by subtracting the first image from the second image;
    remediate the pixel blooming by reducing an intensity of pixel values of a group of bloomed pixels based on a distance measure, wherein the distance measure is calculated based on an absolute value of a log of an L2-norm of a distance from a weighted centroid; and
    operate a vehicle based on the subtracted image.

9. The system of claim 8, further comprising acquiring the first image with an IR video sensor.

10. The system of claim 8, further comprising acquiring the second image with an IR video sensor while illuminating the scene with IR light.

11. The system of claim 8, wherein empirically determined parameters include thresholds and a bounding box overlap ratio.

12. The system of claim 11, wherein remediating the pixel blooming includes removing the pixel blooming or reducing the pixel blooming depending upon the thresholds and the bounding box overlap ratio.

13. The system of claim 12, further comprising determining a group of bloomed pixels based on processing the subtracted image to identify a connected region of saturated pixels and connected regions of background pixels.

14. The system of claim 13, wherein the removing the pixel blooming or reducing the pixel blooming includes setting pixel values of a group of saturated pixels to their original values.

15. A system, comprising:
    means for acquiring images;
    means for controlling vehicle steering, braking and powertrain of a vehicle;
    computer means for:
        acquiring a first image of a scene;
        acquiring a second image of the scene while illuminating the scene;
        identifying pixel blooming in a subtracted image determined by subtracting the first image from the second image;
        remediating the pixel blooming by reducing an intensity of pixel values of a group of bloomed pixels based on a distance measure, wherein the distance measure is calculated based on an absolute value of a log of an L2-norm of a distance from a weighted centroid; and
        operating the vehicle based on the subtracted image by the means for controlling the vehicle steering, braking and powertrain.

16. The system of claim 15, wherein empirically determined parameters include thresholds and a bounding box overlap ratio.

* * * * *